US005157416A

United States Patent [19]

Kinoshita et al.

[11] Patent Number: 5,157,416

[45] Date of Patent: Oct. 20, 1992

[54] LASER SCANNER PROTECTING MECHANISM

[75] Inventors: Naohisa Kinoshita; Hiroyuki Kashima, both of Nagoya, Japan

[73] Assignee: Brother Kogyo Kabushiki Kaisha, Nagoya, Japan

[21] Appl. No.: 726,991

[22] Filed: Jul. 8, 1991

[30] Foreign Application Priority Data

Jul. 26, 1990 [JP] Japan .................................. 2-199952

[51] Int. Cl.$^{5}$ ......................... G01D 9/42; G01D 15/14

[52] U.S. Cl. ...................................... 346/108; 346/160

[58] Field of Search ................. 346/108, 160; 355/200

[56] References Cited

U.S. PATENT DOCUMENTS

| | | | |
|---|---|---|---|
| 4,947,208 | 8/1990 | Komatsu et al. | 355/200 |
| 4,955,693 | 9/1990 | Bobba | 350/319 |
| 5,083,158 | 1/1992 | Kashima et al. | 355/200 |
| 5,095,335 | 3/1992 | Watanabe | 355/210 |

*Primary Examiner*—George H. Miller, Jr.
*Attorney, Agent, or Firm*—Oliff & Berridge

[57] ABSTRACT

A laser scanner protecting mechanism is provided for the laser scanning unit of a laser printer having an upper body and a lower body which divide, the sheet transport path defining a boundary therebetween. The printer permits the upper body to be pivoted away from the lower body to expose inner workings of the printer and to provide access to a process cartridge that is removably mounted into the upper body. The laser scanner unit, mounted in the upper body above the process cartridge, is protected from exposure to dust and solid materials in the air or the inadvertent contact of an operator's hand through an exposure opening by a cover adapted to be moved between a first position for covering the exposure opening of the laser scanner unit when the process cartridge is removed and a second position retracted from the first position when the process cartridge is mounted.

15 Claims, 4 Drawing Sheets

LASER SCANNER PROTECTING MECHANISM

BACKGROUND OF THE INVENTION

1. Field of the Invention

The present invention relates to a protecting mechanism for a laser scanner unit for effecting exposure of a photosensitive body in a laser printer.

2. Description of Related Art

As described in U.S. Pat. No. 4,588,280, a known laser printer is generally constructed such that it can be divided into an upper body and a lower body with a paper transport path defined as a boundary therebetween for convenience of easy clearance of a paper jam. In such a laser printer, the upper body includes a laser scanner unit that precisely directs the path of a laser beam onto a photosensitive body. Further, an integral process cartridge, or an assembly of components, including an image forming means comprising a photosensitive body, developer, cleaner and corona discharger is also mounted in the upper body.

Although these elements of the image forming means are normally exchanged as consumables by a service engineer, the use of a process cartridge enables the operator or user to easily exchange the photosensitive body, developer, cleaner containing spent toner, and corona discharger.

However, in the above conventional laser printer using the process cartridge, the process cartridge is exchanged with the upper body open. Accordingly, when the process cartridge is removed from the upper body, the exposure opening of the laser scanner unit is exposed to the environment. If such an exposed condition of the exposure opening inadvertently lasts too long, there is a strong possibility, practically a certainty, that dust or other solid particles will enter the laser scanner unit from the exposure opening and be deposited on a lens or a mirror that are components of the laser scanner unit. The result is a degradation in the quality of the image formed.

Further, the correcting optical system for the laser beam, e.g., a cylindrical lens is located in the vicinity of the exposure opening of the laser scanner unit. In this type laser printer, when the upper body is opened, and the process cartridge is removed from the upper body for exchange, the operator can easily touch the cylindrical lens with his hand causing a stain on or mark the surface of the lens. As a result, the exposure of the photosensitive body by the laser beam is adversely effected which also greatly reduces image quality.

SUMMARY OF THE INVENTION

It is accordingly an object of the present invention to provide a laser scanner protecting mechanism which can prevent the degradation of the formed image, resulting from the entry of dust or other materials through the exposure opening of the laser scanner unit during the exchange of the process cartridge and/or the inadvertent touch of the operator's hand to the lens, by automatically covering the exposure opening with a cover during the exchange of the process cartridge when the upper body of the laser printer is open.

According to the present invention, there is provided a laser scanner protecting mechanism for a laser printer, for printing a image on a sheet in a sheet transport path, that has an upper body and a lower body, which define whole body, and the sheet transport path forms a boundary therebetween. An opening is formed by moving the upper body away from the lower body to expose the inner workings of the laser printer and the process cartridge containing a photosensitive member, that is removably mounted in the upper body, can be removed through the opening. A laser scanner unit is mounted in the upper body for effecting exposure of the photosensitive member contained in the process cartridge. The laser scanner unit has an exposure opening formed so as to expose the photosensitive member when the process cartridge is mounted in the upper body and has a cover that moves between a first position for covering the exposure opening of the laser scanner unit and a second position retracted from the first position, the covering being in the second position when the process cartridge is mounted and in the first position after removal of the process cartridge.

With this structure, when the process cartridge is removed from the upper body, after the upper body has been opened, the cover provided in the upper body is cooperatively moved to cover the exposure opening of the laser scanner unit. Accordingly, the entry of dust or the like from the exposure opening into the laser scanner unit is prevented. Further, in cooperation with the removing of the process cartridge from the upper body, the optical system located near the exposure opening of the laser scanner unit is also covered by the cover. Accordingly, an inadvertent touching of the operator's hand to the optical system is prevented. As a result, the laser beam exposure of the photosensitive body is not adversely affected in the manner of the prior art devices and a more consistent or stable quality of the image is obtained.

Furthermore, in cooperation with the insertion of the process cartridge into the upper body, the cover covering the exposure opening is moved to open the exposure opening and allow the exposure by the laser scanner unit. Accordingly, upon exchanging the process cartridge, the exposure of the photosensitive body in the process cartridge by the laser scanner unit can be immediately effected without any special operation, thereby improving the operability in the exchanging operation of the process cartridge.

BRIEF DESCRIPTION OF THE DRAWINGS

The invention will be described with reference to the drawings, in which.

DESCRIPTION OF THE PREFERRED EMBODIMENT

Figure 1:
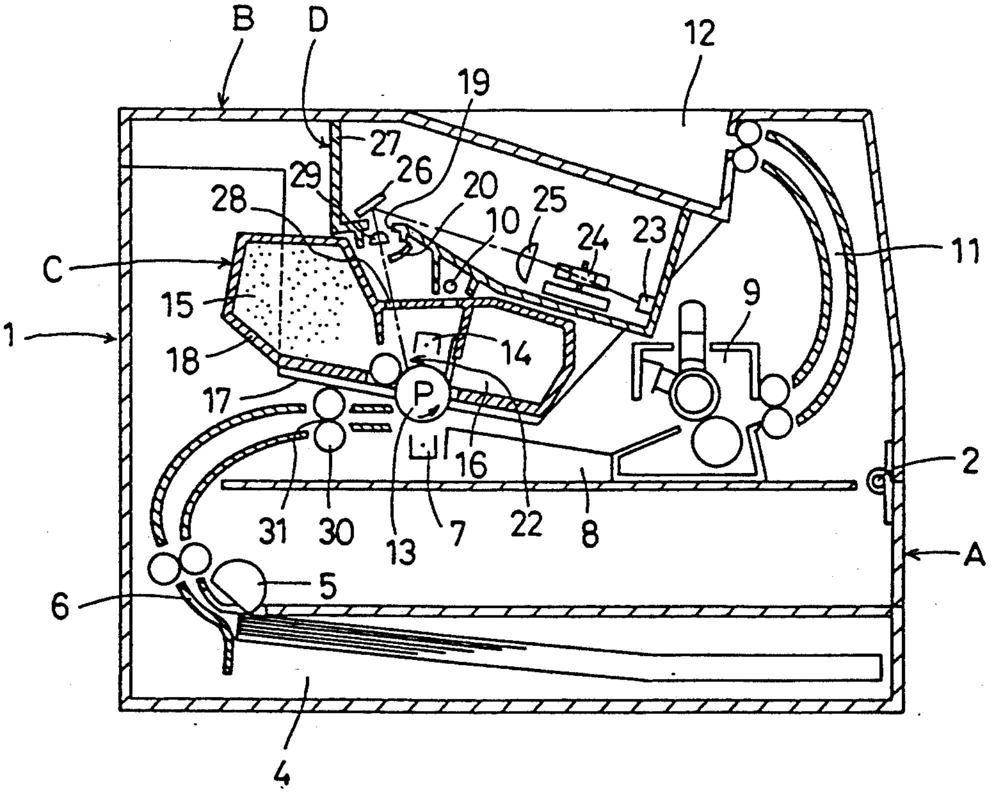
FIG. 1 is a vertical sectional view of a laser printer according to a preferred embodiment of the invention in a closed condition.
Figure 2:
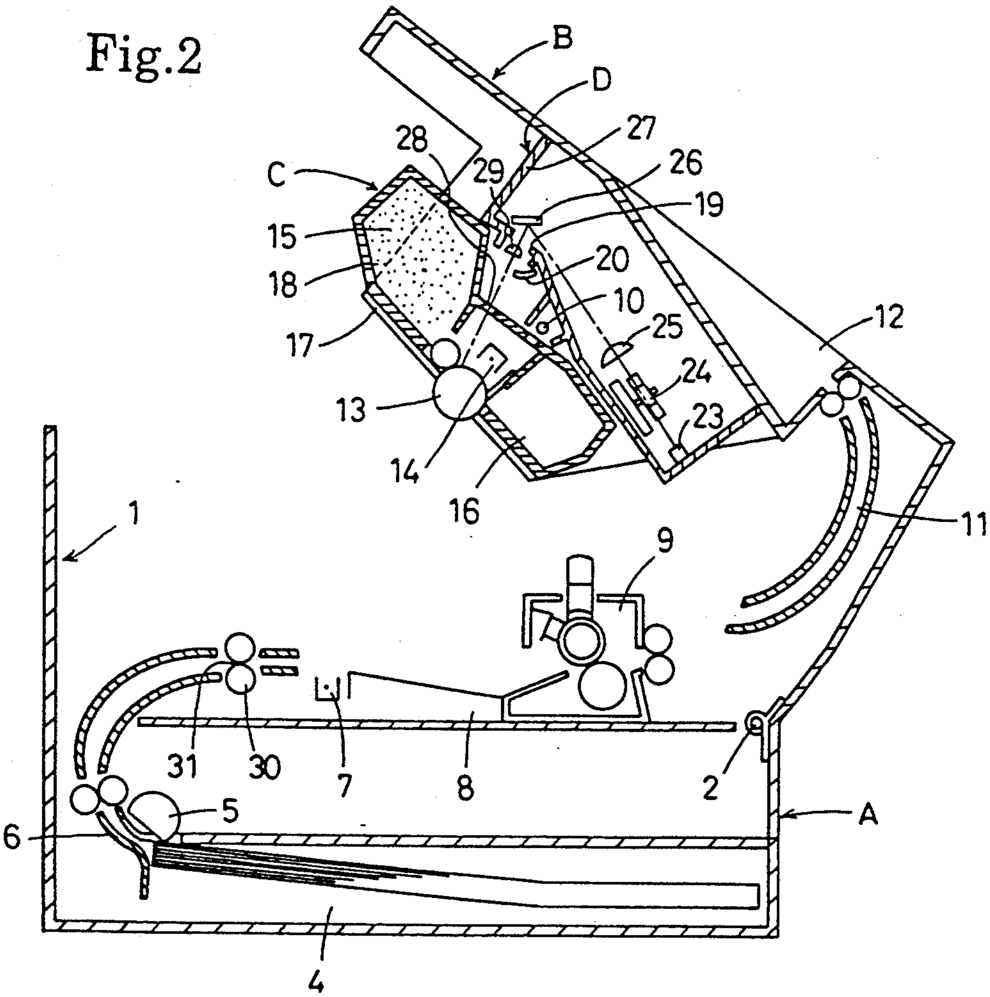
FIG. 2 is a view similar to FIG. 1, showing the open condition of the upper body.

FIGS. 1 and 2 shows, in vertical section, the structure of a laser printer 1.

The laser printer is generally structured to have a lower body A and an upper body B. The upper body B is pivotably connected by a hinge 2 to the lower body A so that the upper body B is rotatable about the hinge 2 to open relative to the lower body A. As shown in FIG. 2, the upper body B can be kept in an open position with a large opening angle, about the hinge 2, relative to the lower body A. When upper body B is open as shown, an operator can easily exchange a process cartridge C (to be described), eliminate a paper jam or perform other necessary actions.

The lower body A is provided at its bottom portion with a paper feed section 6 including a paper cassette 4 and a paper feed roller 5. An image transfer charger 7 is located in an upper portion of the lower body A at a position opposed to the drum type electrophotographic photosensitive body 13 (to be described) of the process cartridge C when the upper body B is closed. A paper transport section 8 is located on a downstream side of the image transfer charge 7 with respect to the paper transport direction. Further, an image fixing section 9 is located downstream, in the paper transport direction, of the paper transport section 8.

When the upper body B is closed, as shown in FIG. 1, the process cartridge C is positioned to be opposite to the image transfer charger 7, the paper transport section 8 and the image fixing section 9.

The paper transport path is defined by the image transfer charger 7, the paper transport section 8, the image fixing section 9, and the photosensitive body 13 of the process cartridge C.

The process cartridge C incorporates various process elements including the photosensitive body 13 (which will be referred to as drum 13), a charger 14, a developer 15, and a cleaner 16. When the upper body B is open, the process cartridge C can be removed from or mounted in a fixed position in the upper body B, along a guide member 17 provided therein. The various process elements are arranged within a cartridge housing 18 of the process cartridge C. The process cartridge C is inserted into or removed from the fixed position in the upper body B by gripping a front portion of the cartridge housing 18 on the developer 15 side by hand. No tools are necessary to insert or remove process cartridge C from upper body B.

A laser scanner unit D for effecting scanning exposure of the drum 13 by the laser beam is provided above the process cartridge C. The laser scanner unit D comprises a semiconductor laser 23, a polygon mirror 24, a f-$\theta$ lens 25, a reflector mirror 26, and a scanner housing 27 for supporting these elements. The scanner housing 27 is formed with an exposure opening !9 for allowing the exposure of the drum 13. The cartridge housing 18 of the process cartridge C is also formed with an exposure opening 28 for allowing the exposure beam access to the drum 13. A cylindrical lens 29 is located between the exposure opening 19 and the exposure Opening 28. The cylindrical lens 29 serves to correct irregularities in a laser beam, such as a variation in face angle accuracy, in a direction perpendicular to the scanning direction of the beam due to profile irregularities in each face of the polygon mirror 24. Further, a pre-exposure lamp 10 is located just above the process cartridge C.

A paper guide section 11 is located downstream of the image fixing section 9. Further, a paper eject tray 12 is located at the top of the upper body B and is fed by paper guide section 11.

Figure 3:
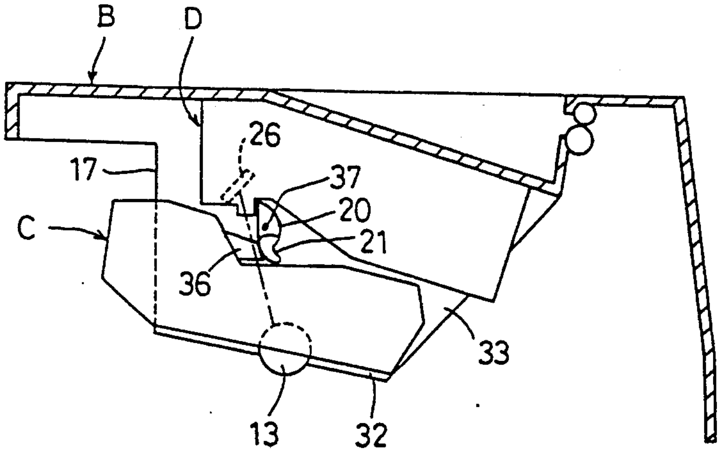
FIG. 3 is a vertical sectional view of the upper body under the condition where the process cartridge is mounted to open a scanner protecting mechanism.
Figure 4:
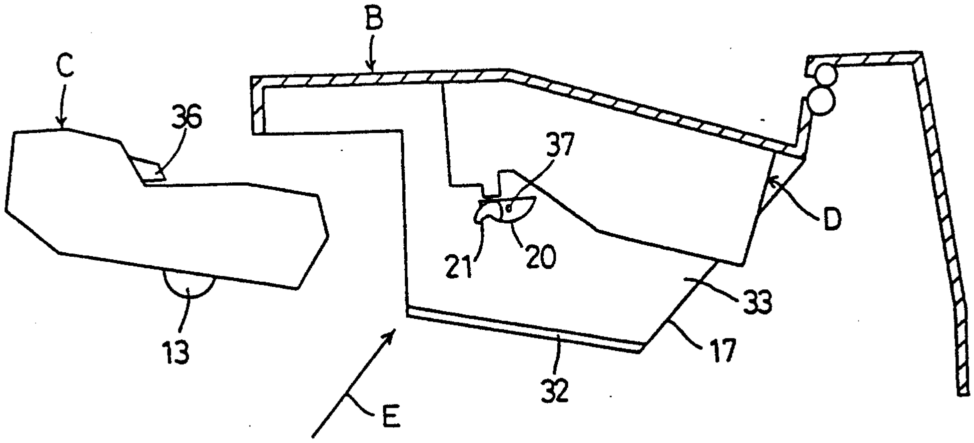
FIG. 4 is a view similar to FIG. 3, showing the condition where the process cartridge is removed to close the scanner protecting mechanism.
Figure 5:
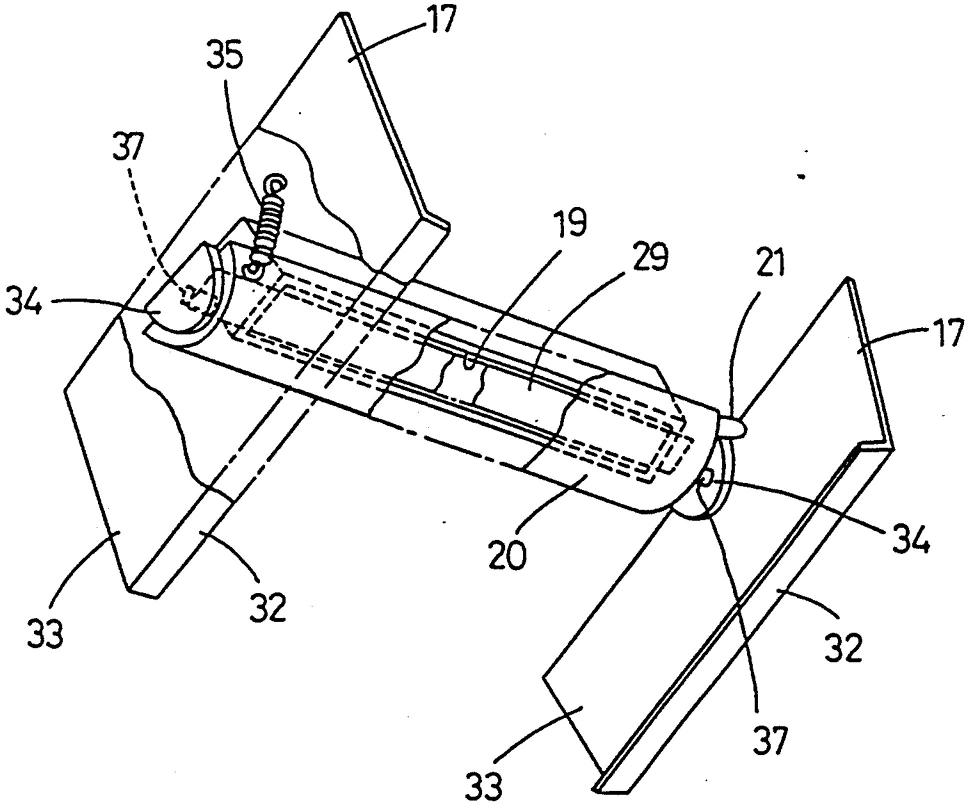
FIG. 5 is an enlarged perspective view of an essential part of the laser scanner protecting mechanism as viewed in a direction of arrow E in FIG. 4.

There will now be described a laser scanner protecting mechanism according to the present invention with reference to FIGS. 3, 4 and 5. FIG. 5 is an enlarged perspective view of an essential part of the laser scanner protecting mechanism as viewed in the direction of arrow E in FIG. 4.

As shown in FIG. 5, the guide member 17 provided in the upper body B is constructed of a pair of side walls 33 for fixing the position of the process cartridge C in a longitudinal direction thereof. A pair of guide rails 32, upon which the process cartridge C rests, are formed at lower ends of the side walls 33. In mounting the process cartridge C into the upper body B, the process cartridge C is guided by the guide member 17 until the process cartridge C is brought to the fixed position in the upper body B as shown in FIG. 3. A cover 20, for covering the cylindrical lens 29 and the exposure opening 19 of the laser scanner unit D, is provided at a lower portion of the laser scanner unit D. The cover 20 (FIG. 5) is formed at its longitudinal opposite ends with a pair of projection shafts 37. The projection shafts 37 are rotatably supported in a pair of cover supporting members 34 provided at the lower portion of the laser scanner unit D. The cover 20 is normally biased by a spring 35 in a counterclockwise direction as viewed in FIG. 5, i.e., in a closing direction such that the cylindrical lens 29 and the exposure opening 19 are covered by the cover 20.

Further, the cover 20 is formed with an arm 21 adapted to engage an engagement means 36 provided on an outer surface of the developer 15 of the process cartridge C. Accordingly, when the process cartridge C is inserted into the upper body B, the engagement means 36 of the process cartridge C is brought into engagement with the arm 21 of the cover 20 to rotate the cover 20 in a clockwise direction, as viewed in FIG. 5, against a biasing force of the spring 35, to open the cover 20 from a first position, where the exposure opening 19 and the cylindrical lens 29 are covered by the cover 20, to a second position, where the cover 20 is retracted to permit the exposure beam access to the drum 13 of the process cartridge C.

The exposure opening 19, or the cylindrical lens 29 as a final optical system, is wide enough to permit the formation of an electrostatic latent image on the drum 13 by the laser beam from the laser scanner unit D, while the cover 20 has a width and a depth sufficient to cover the exposure opening 19 and the cylindrical lens 29.

The operation of the laser printer will now be described.

Image recording is carried out with the printer as shown in FIG. 1 where the process cartridge C is mounted in the upper body B and the upper body B is in the closed position with respect to the lower body A.

First, the drum 13 is rotated in the direction of an arrow P at a predetermined peripheral speed by an image recording start signal.

During the rotation of the drum 13, the circumferential surface of the drum 13 is subjected to whole image pre-exposure by the pre-exposure lamp 10 and is then subjected to positive or negative uniform charging by the charger 14.

Then, the circumferential surface of the drum 13 is subjected to scanning exposure, by the laser beam from the laser scanner unit D at an exposure section 22, to form an electrostatic latent image of an object image on the circumferential surface of the drum 13.

The scanning exposure is carried out in the following manner. That is, a laser beam modulated according to a time series electrical pixel signal of the object image is first output from the semiconductor laser 23 to the polygon mirror 24. Then, the scanning speed of the laser beam reflected by the polygon mirror 24 with respect to a rotating angle of the polygon mirror 24 is converted into a substantially uniform speed by the f-θ lens 25. The output direction of the laser beam is then changed by the reflector mirror 26 so as to pass the laser beam through the exposure opening 19 of the laser scanner unit D. After passing through the exposure opening 19, the laser beam is scanned through the cylindrical lens 29 onto the circumferential surface of the drum 13 in an axial direction thereof.

The electrostatic latent image formed on the circumferential surface of the drum 13 is developed by toner contained in the developer 15. The developed toner image formed on the circumferential surface of the drum 13 is transferred onto a sheet of paper fed from the paper feed section 6 to pass between the drum 13 and the image transfer charger 7 in synchronization with the rotation of the drum 13.

The paper feed section 6, in addition to the paper cassette 4 containing stacked sheets of paper and the paper feed roller 5 having a semi-lunar shape, also includes a pair of register rollers 30. The paper feed roller 5 is intermittently rotated in a paper feeding direction at a predetermined feed timing for one or more revolutions. Accordingly, every intermittent rotation of the paper feed roller 5 feeds a sheet of paper in the paper cassette 4 to the register rollers 30.

Then, the paper fed from the paper cassette 4 by the paper feed roller 5, having reached the register rollers 30, is maintained at rest once the leading end of the paper is received at a nip portion 31 between the two register rollers 30. Thereafter, the paper is further fed to the transfer section by the register rollers 30 driven at a predetermined timing synchronized with the rotation of the drum 13.

After transferring the toner image to the paper, the paper is separated from the circumferential surface of the drum 13 and is transported through the paper transport section 8 to the image fixing section 9. After fixing the toner image onto the paper, the paper is further transported through the paper guide section 11 to the paper eject tray 12.

The circumferential surface of the drum 13, after separating from the paper, is cleaned by the cleaner 16 and then commences a new cycle of image formation.

The above-mentioned image recording is controlled by a control system (not shown) to sequentially form the object image.

When the operator opens the upper body B and withdraws the process cartridge C from the guide member 17 in order to exchange the process cartridge C, or exchange one of the process elements of the process cartridge C, the engagement means 36 of the process cartridge C disengages from the arm 21 of the cover 20. Accordingly, the cover 20 is rotated about the projection shafts 37 by the biasing force of the spring 35 to cover the exposure opening 19 of the laser scanner unit D and the cylindrical lens 29.

Conversely, when the operator mounts a process cartridge C into the upper body B, the engagement means 36 of the process cartridge C engages the arm 21 of the cover 20 to rotate the cover 20 about the projection shafts 37 against the biasing force of the spring 35. Accordingly, the cover 20 is retracted from the position for covering the exposure opening 19 of the laser scanner unit D and the cylindrical lens 29, thus allowing the exposure beam from the laser scanner unit D to strike the drum 13 of the process cartridge C.

Further, the guide rails 32 of the guide member 17 are formed to guide the opposite lower edge portions of the process cartridge C, and the side walls 33 of the guide member 17 are formed to cover the opposite side surfaces of the process cartridge C. Accordingly, during the mounting of the process cartridge C, the exposure opening 19 and the cylindrical lens 29 are protected by the process cartridge C. Therefore, even though the upper body B is open, the operator's hand cannot touch the cylindrical lens 29. In addition, once the process cartridge C is mounted in the upper body B and cover 20 retracted, the exposure opening 19 is effectively covered or enclosed by the process cartridge C and the guide member 17, thereby preventing dust or other solid materials from entering the laser scanner unit D through the exposure opening 19.

What is claimed is:

1. A laser scanner protecting mechanism of a laser printer for printing an image on a sheet in a sheet transport path comprising:

a body;

an opening section formed on said body for exposing an inner mechanism to outside of said body;

a process cartridge containing a photosensitive member adapted to be removably mounted into said body through said opening section; and a laser scanner unit mounted in said body for effecting exposure of the photosensitive member contained in said process cartridge, wherein said laser scanner unit has an exposure opening so formed as to expose the photosensitive member when said process cartridge is mounted into said body and a cover adapted to be moved between a first position for covering said exposure opening of the laser scanner unit when said process cartridge is removed from the laser printer and a second position retracted from the first position when said process cartridge is mounted, said cover moving between said first and second positions in cooperation with mounting and removing of said process cartridge.

2. The laser scanner protecting mechanism according to claim 1, wherein said body comprises an upper body and a lower body both of which are adapted to divide the laser printer body along a sheet transport path defined boundary therebetween and said opening section is formed by pivoting said upper body away from said lower body.

3. A laser printer comprising:

a body having an upper portion and a lower portion, said upper and lower portions pivotally connected at a side;

a laser scanner unit fixedly mounted in said upper portion;

a process cartridge removeably mounted in said upper portion;

a first opening in a lower surface of said laser scanning unit;

a second opening in an upper surface of said process cartridge, said first and second openings aligned to permit passage of a laser beam; and a cover movably mounted to said upper portion to cover said first opening.

4. A laser printer as claimed in claim 3, wherein said process cartridge is mounted immediately below said laser scanner unit by means of a guide member.

5. A laser printer as claimed in claim 4, wherein said process cartridge includes a photosensitive member that is exposed by said laser scanner unit.

6. A laser printer as claimed in claim 4, wherein said guide member further comprises opposing and spaced apart side walls, said side walls having an inwardly turned lip at their lower extensions to provide guide rails for inserting and removing said process cartridge.

7. A laser printer as claimed in claim 6, wherein said process cartridge is seated on said guide rails and between said side walls when mounted.

8. A laser printer as claimed in claim 6, wherein said cover is rotatably mounted between said side walls.

9. A laser printer as claimed in claim 8, wherein said process cartridge includes a photosensitive member that is exposed by said laser scanner unit.

10. A laser printer as claimed in claim 3, wherein said process cartridge comprises:

a photosensitive body;

a charger;

a developer; and a cleaner.

11. A laser printer as claimed in claim 3, wherein said cover comprises:

a cover member, said cover member rotatable about a projection shaft extending from each end of said cover member;

an arm projecting forwardly and downwardly from said cover member; and a biasing member attached between said cover member and said upper portion.

12. A laser printer as claimed in claim 11, wherein said cover is rotatable between a first position for covering said first opening and a second position away from said first opening.

13. A laser printer as claimed in claim 12, wherein said process cartridge contacts said arm to rotate said cover member from said first position to said second position during mounting and said biasing member moves said cover member from said second position to said first position when said process cartridge is removed.

14. A laser printer as claimed in claim 3, wherein said cover is rotatable between a first position for covering said first opening and a second position away from said first opening.

15. A laser printer as claimed in claim 3, further comprising a contacting member for contacting said process cartridge and operating to move said cover between a first position for covering said first opening and a second position away from said first opening according to a position of said process cartridge.

* * * * *